(12) United States Patent
Holmberg

(10) Patent No.: US 7,623,898 B2
(45) Date of Patent: Nov. 24, 2009

(54) COVER FOR PORTABLE DEVICE

(75) Inventor: Per Holmberg, Dalby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 459 days.

(21) Appl. No.: 11/617,757

(22) Filed: Dec. 29, 2006

(65) Prior Publication Data

US 2008/0000937 A1 Jan. 3, 2008

Related U.S. Application Data

(60) Provisional application No. 60/806,001, filed on Jun. 28, 2006.

(51) Int. Cl.
*H04M 1/00* (2006.01)
(52) U.S. Cl. ............... 455/575.8; 455/90.3; 455/575.1; 206/320
(58) Field of Classification Search ............. 455/575.8, 455/90.3, 575.1; 206/320
See application file for complete search history.

(56) References Cited

U.S. PATENT DOCUMENTS

| | | | | |
|---|---|---|---|---|
| 5,873,456 | A * | 2/1999 | Hull et al. | 206/38.1 |
| 6,731,913 | B2 * | 5/2004 | Humphreys et al. | 455/90.3 |
| 6,980,777 | B2 | 12/2005 | Shepherd et al. | |
| 7,050,841 | B1 | 5/2006 | Onda | |
| 2002/0136557 | A1 * | 9/2002 | Shimamura | 396/535 |
| 2003/0111366 | A1 | 6/2003 | Enners | |
| 2004/0154941 | A1 * | 8/2004 | Montler | 206/320 |
| 2004/0203486 | A1 | 10/2004 | Shepherd et al. | |
| 2005/0116003 | A1 | 6/2005 | Butler et al. | |

FOREIGN PATENT DOCUMENTS

| | | |
|---|---|---|
| EP | 1301011 | 4/2003 |
| WO | 00/51315 A | 8/2000 |
| WO | 00/62509 | 10/2000 |
| WO | 02/03828 | 1/2002 |
| WO | 02/11161 | 2/2002 |
| WO | 02/88914 | 11/2002 |
| WO | 03/041288 A | 5/2003 |

OTHER PUBLICATIONS

Office Action mailed Jun. 8, 2009 from related U.S. Appl. No. 11/617,747.
Office Action mailed on Jun. 2, 2009 from related U.S. Appl. No. 11/617,746.

* cited by examiner

*Primary Examiner*—Sanh D Phu
(74) *Attorney, Agent, or Firm*—Renner, Otto, Boisselle & Sklar, LLP

(57) ABSTRACT

A cover for a portable device comprising; a main body (2) with resilient parts, an opening provided in a resilient part (8) for insertion and removal of the portable device in an insertion/removal direction, wherein the main body is provided with a number of elements projecting on the inside, extending in parallel with the insertion/removal direction.

6 Claims, 6 Drawing Sheets

COVER FOR PORTABLE DEVICE

FIELD OF THE INVENTION

The invention relates to a cover for a portable device. Specifically, the invention relates to a water, dust, sand and chock resistant cover for a portable device.

BACKGROUND OF THE INVENTION

Today, the increasing popularity of mobile phones has led to the requirement that mobile phones must be able to operate in different settings, such as in humid environment and the like. A user that takes part in an outdoor activity wants to be able to bring the portable device with him and that no harm comes to the mobile phone due to dust, sand, moisture or the like.

To this end, a cover comprises resilient, softer parts that may be deformed enabling the user to press underlying buttons and the like. It also comprises substantially non-resilient, harder parts to impart stability to the cover. Transparent parts may be provided to make a display and buttons visible. There may also be parts letting sound pass, letting in sounds to a microphone and letting out sounds from speaker elements. The cover is customized to fit snugly a particular model of the portable device.

Suitably, the resilient parts are made from silicone or thermoplastic elastomer TPE or thermoplastic urethane elastomer TPU or combinations thereof. The substantially non-resilient parts may be made from hard plastic. The transparent parts may be made from high gloss plastic, and some parts may be made from plastic or glass with optical quality for location in front of camera lenses. Instead of transparent parts, the cover may be printed to indicate texts and symbols of underlying buttons. Sound permeable membranes may be made from air/gas permeable materials that are non-permeable to water and liquids, such as materials from Gore-Tex™. All such materials are known as such.

There is also a requirement that it should be easy to move the device from the cover and insert it again, when desired. Some people use the cover when working in hazardous environments, while other people spend their leisure time where the portable device may be exposed to water, dust and sand etc. Typically, a user wants to remove the device from the cover when the situation permits.

In the document U.S. Pat. No. 6,980,777 B2 a cover for a mobile phone is disclosed. The interior of the cover comprises surface features. However, these features are provided to retain the mobile phone within the cavity, i.e. to increase the friction between the mobile phone and the cover.

SUMMARY OF THE INVENTION

The present invention deals with the problem of inserting and particularly removing a portable device from a cover. As the cover is airtight, possibly except for small holes with air permeable membranes over microphone and speaker elements, the resilient parts of the cover is sucked against the device when the device is pulled out, unless air is permitted to flow in at the sides to the space formed behind the device opposite the opening. Even though e.g. silicon may be a material with a low coefficient of friction, i.e. slippery, the sucking action causes high friction and an under-pressure inside the cover. During insertion of the portable device, the problem is smaller, as the air pressure pushes the cover from the sides of the portable device. In the above stated prior art the features of the interior surface are apt to increase the friction, while the features of the invention tend to decrease the friction between the cover and the portable device.

The invention relates to a water, dust, sand and chock resistant cover for a portable device, such as a mobile telephone. The device may be used without removing it from the cover but, when it is desirable of the user, may also be able to be removed from the cover in an easy and swift way.

For this reason, the cover according to the invention is provided with a cap with a tight seal. The cap may be put on and taken off with a snapping action.

The present invention provides a cover for a portable device comprising a main body with resilient parts, an opening provided in a resilient part for insertion and removal of the portable device in an insertion/removal direction, wherein the main body is provided with a number of elements projecting on the inside, extending in parallel with the insertion/removal direction.

Furthermore the cover may comprise substantially non-resilient parts, wherein the elements are provided mainly on the resilient parts.

In addition, the cover may comprise elements that are arranged to avoid contact with a keypad of the portable device.

In one embodiment, the elements are generally rounded protuberances projecting on the inside of the cover.

In another embodiment, the elements are ribs extending in a direction of the cover at an angle to the insertion direction of the mobile device, the angle ranging from 0 degrees to approximately 60 degrees.

The ribs may extend substantially along the whole length of the cover.

In a further embodiment, the elements are ribs extending substantially in parallel with the insertion/removal direction.

In an embodiment of the invention the cover comprises, at each side, at least two ribs provided at the top inner corner, one rib provided at the lower corner, and a number of ribs provided at the lower flat side.

BRIEF DESCRIPTION OF THE DRAWINGS

The above and further features, advantages and benefits of the present invention will be apparent upon consideration of the following detailed description. The detailed description is to be taken in conjunction with the accompanying drawings, in which the same reference characters and figures refer to the same components or method steps throughout, and in which.

DETAILED DESCRIPTION OF EMBODIMENTS OF THE PRESENT INVENTION

Figure 1:
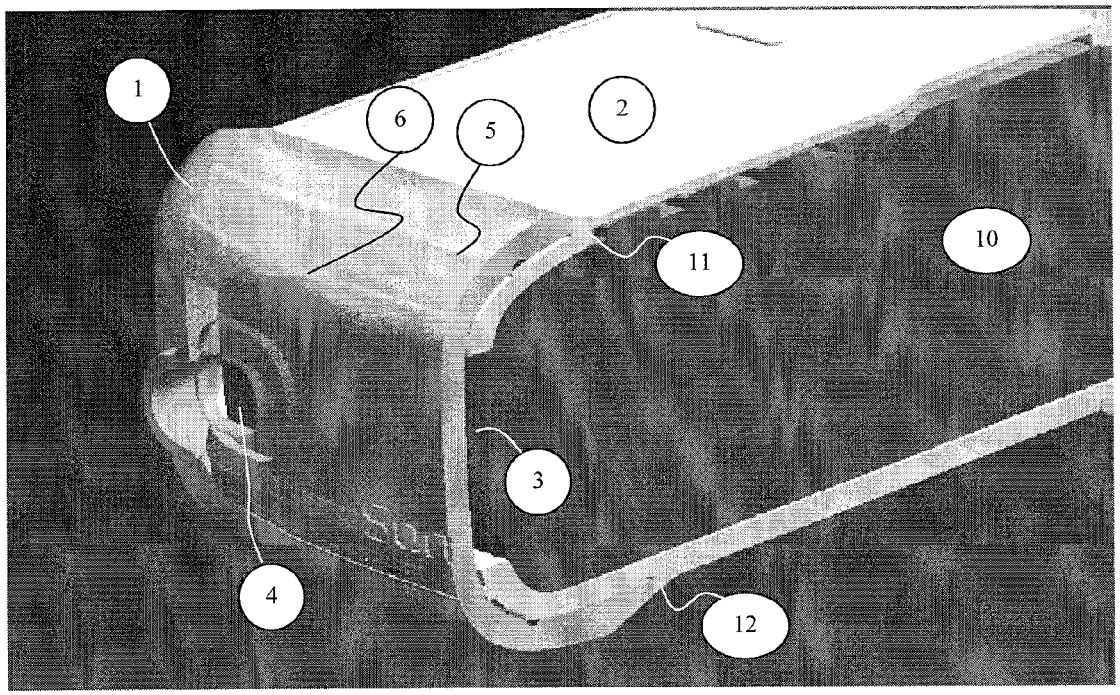
FIG. 1 is a perspective view partly in cross section of the cover with the portable device inserted.
Figure 2:
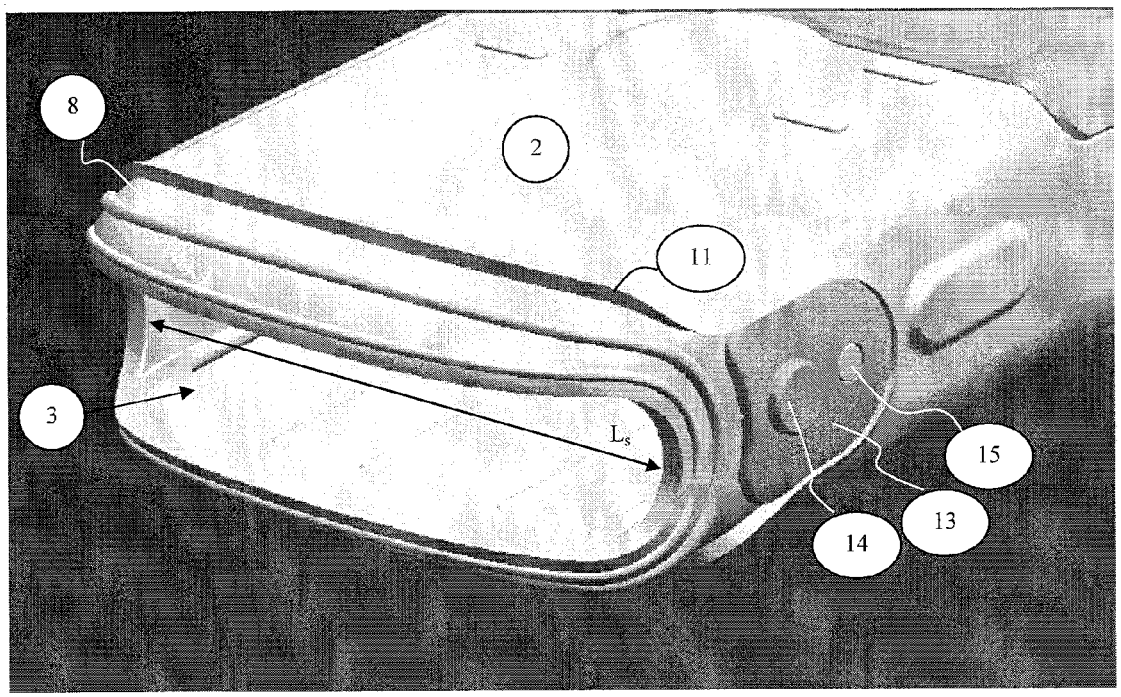
FIG. 2 is a perspective view of the cover without device and without cap.

In the figures the substantially non-resilient parts appear as darker, while the resilient parts are shown with a lighter shade. Referring to FIG. 1 and FIG. 2, a cover containing a portable device 10 is shown. The cover comprises a cap 1 of substantially non-resilient material closed over an opening 3 of the main body 2 of the cover at the left of FIGS. 1, 3 and 4. Referring to FIG. 2, the opening 3 is preferably arranged at the smallest side so that the sealing length, Ls, is as small as possible.

Figure 3:
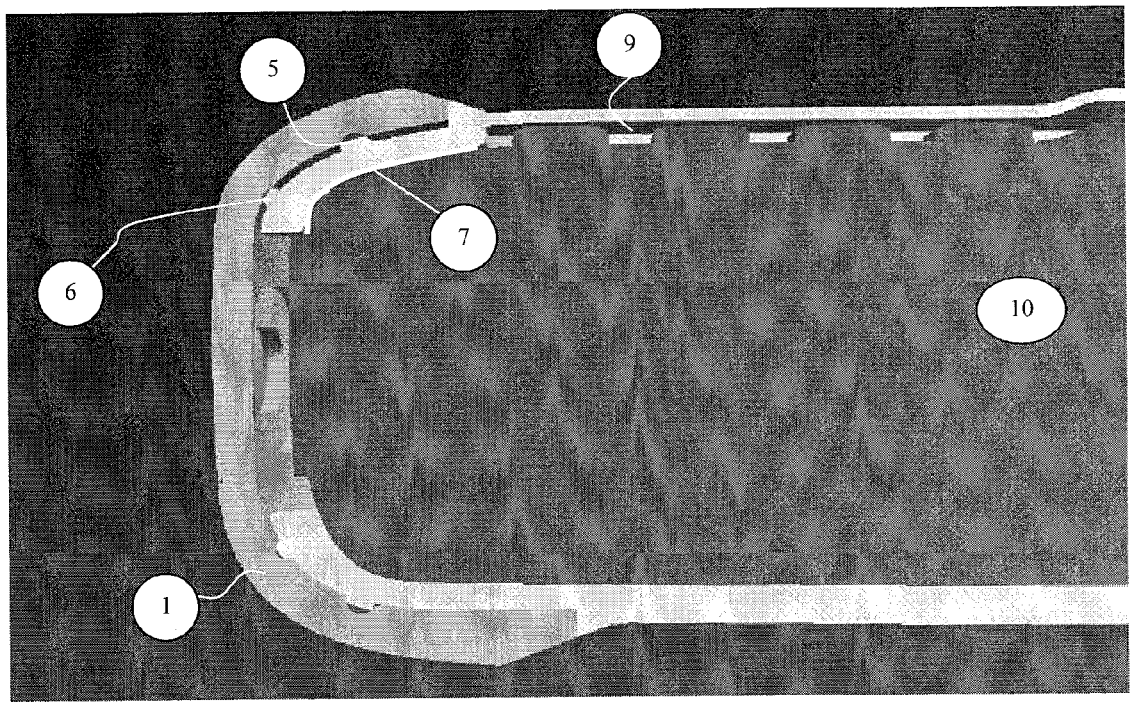
FIG. 3 is a longitudinal cross section of the cover with an inserted device.

The cap 1 is substantially smooth on the inside and is of a material that is less resilient than the cover in order to enhance the stability of the cover, e.g. hard plastic, hard rubber or the like. A sound hole 4 is also visible. An air permeable membrane (not shown) may be arranged at the sound hole in order to keep the cover waterproof. When a portable device 10, such as a mobile telephone with buttons, is inserted the situation is as shown in FIG. 1 and FIG. 3. The portable device 10 supports a resilient part 8 around the opening 3 from the inside, thereby providing an inner seal at areas 7 around the whole opening 3. The resilient part around the opening is self-centering against the portable device 10, e.g. the edges of resilient part are tapering towards a center axis of the cover thereby directing the portable device 10 to a centered position. By directing the portable device 10 into a centered position the resilient part 8 of the cover is strengthened and the seal is improved.

Referring to FIG. 3, the so called inner seal 7, the white line along the resilient part of the main body, is shown. In the figure the tapered shape of the resilient part is clearly disclosed and as can be seen the inner seal is formed corresponding to the tapering part of the main body of the cover. As can be seen in FIG. 3 the tapering part of the main body is formed around the bottom of the portable device 10 and one side of the main body is formed in a shape to provide space 9 for keys of the portable device 10.

The outer surface of the resilient part 8 around the opening is provided with at least one, preferably two, beads 5 and 6. It should here be understood that the number of beads may vary due to size of the cover, preference or the like. The outer bead 5 provides the main seal, and the somewhat smaller bead, closer to the opening, provides a secondary seal 6. In an embodiment of the invention the beads are the same size. When the cap is attached to the cover, the beads are compressed to form tight seals, shown in the figures as gray areas on the beads. Alternatively, the cap may be provided with inner recesses to accommodate the beads 5 and 6, but such recesses are not necessary. It should here be noted that the surface of the resilient part 8 may instead be arranged with no beads rendering a smooth surface wherein in the cap 1 is press fitted over the resilient part.

In the illustrated example as shown in FIG. 3, the resilient part 8 of the main body forms an upper lip and a lower lip surrounding the opening 3. The interior of the upper and the lower lip has a curved shape. However, in an embodiment of the invention the interior as well as the exterior of the lips have a substantially planar shape, resulting in the use of a cap with corresponding interior.

Furthermore, a shoulder 11, 12 is arranged on the main body of the cover to form a stop lip for each edge of the cap 1 to press against in order to form tight seals between the main body of the cover 2 and the cap 1, enhancing the seal between the cap 1 and the main body 2 of the cover.

Figure 4:
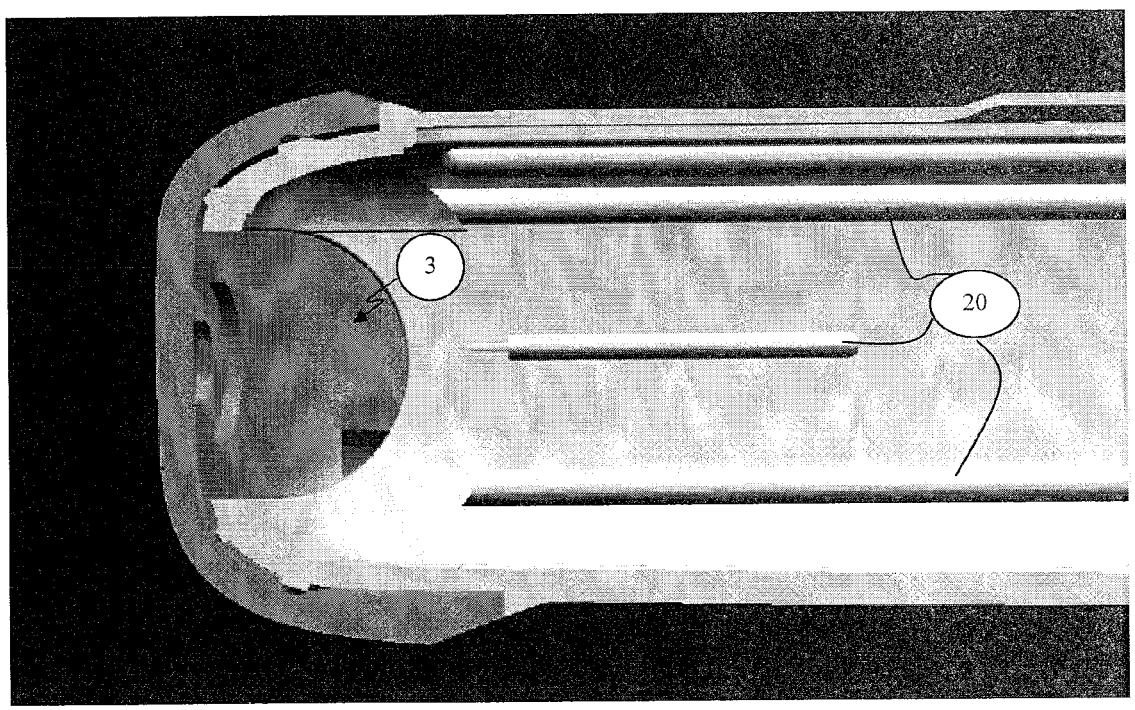
FIG. 4 is a longitudinal cross section of the cover without device.
Figure 6:
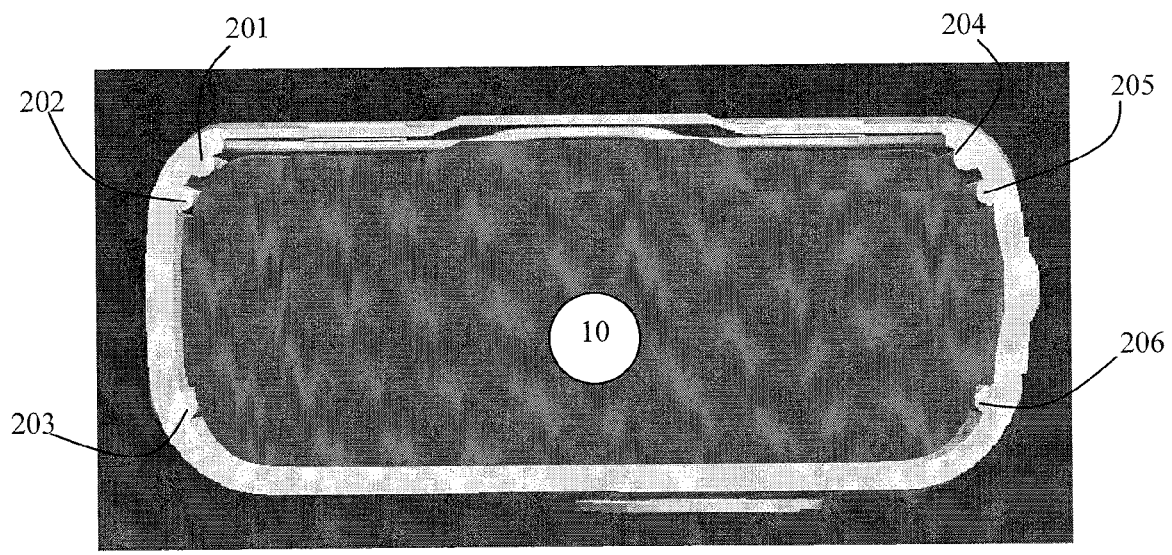
FIG. 6 is a transverse cross section of the cover with an inserted portable device.

Referring to FIG. 4, in an embodiment of the invention the interior of the cover is provided with protruding longitudinal ribs 20. Theses ribs are arranged in order to facilitate the movement of the portable device 10 relative the main body of the cover as well as fixating the portable device in relation to the cover. Referring to FIG. 6, in the illustrated embodiment, the cover is provided with a number of ribs 201-209 projecting on the inside of the cover. Next to the ribs small gaps or channels are formed allowing air to flow in and out of the cover as the portable device is pulled out or pushed in, respectively. The ribs also reinforce the cover, even though it is not their primary function. In order to decrease the friction the ribs must be arranged to let flow of the air pass between the cover and the mobile phone. The ribs are extending in a longitudinal direction of the cover, i.e. parallel to the insertion direction of the mobile device. In the illustrated embodiment the ribs extend substantially along the whole cover.

In another embodiment, the ribs are extending in a direction of the cover at an angle to the insertion direction of the mobile device. The angle may e.g. range from 0 degrees (parallel as shown) to approximately 60 degrees, as long as air flow is permitted between the cover and the mobile phone.

In a further embodiment, the ribs are replaced by knobs (not shown) or other generally rounded protuberances projecting on the inside of the cover performing the same venting function.

Thus, the venting function may be performed by a variety of elements.

Figure 7:
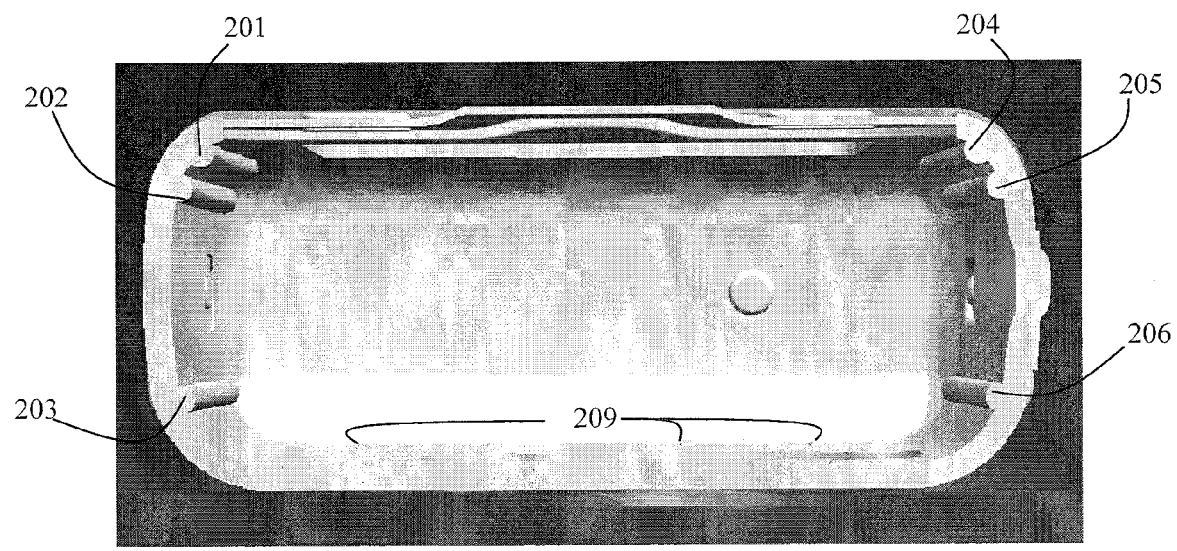
FIG. 7 is a transverse cross section of the cover without device.
Figure 9:
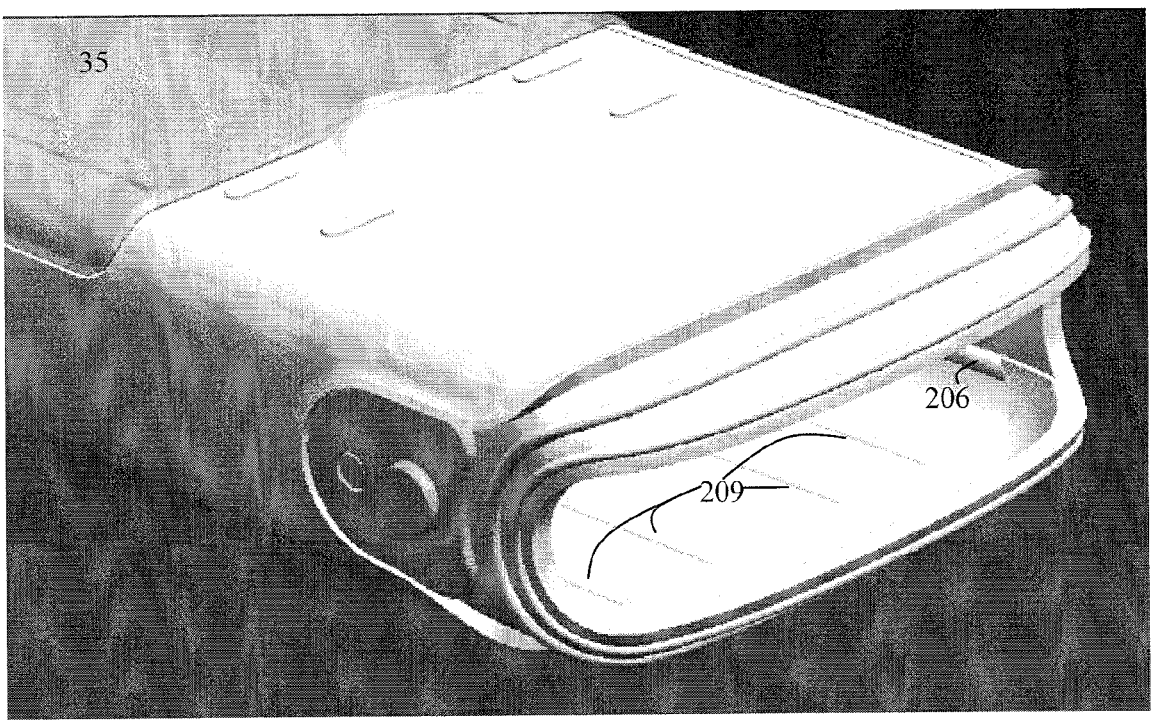
FIG. 9 is a perspective view of the cover looking into an opening.

Preferably, at each side, there are two ribs 201, 202 in the left upper corner as well as the right upper corner 203, 204, i.e. towards the side with the keypad, in case of a cover for a mobile telephone, one rib 205 close to the left lower corner, one rib 206 close to the right lower corner and four ribs 209 at the bottom flat side (shown in FIG. 7 and FIG. 9). The placements of the ribs are made in order to avoid ribs in contact with keys of a mobile phone as well as reinforcing said cover. Hence, the placements of the ribs are based on the portable device aimed to be using the cover. In the illustrated example the rib 201 is placed in corner forcing the portable device downwards, rendering a small space for the keypad of the portable device.

Figure 8:
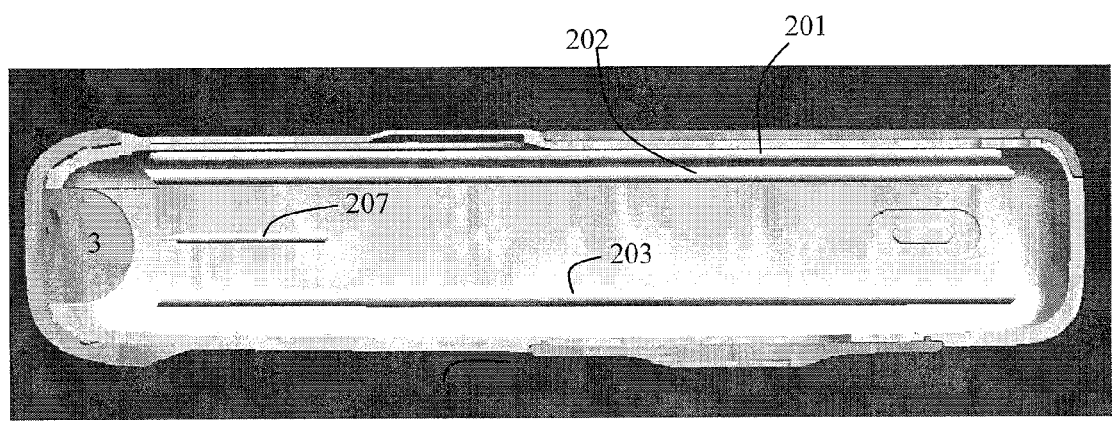
FIG. 8 is a longitudinal section of the cover without device.

In the illustrated embodiment shown in FIG. 8, a rib 207 is shown. The rib 207 extends partially along the inside of the cover. These (a similar one is arranged on the side not shown) ribs 207 are arranged on the cover to stabilize the portable device sideways in the cover suitable for an intended model of the portable device.

In an embodiment of the present invention the ribs 201-206 placed in the corners are larger, i.e. protruding more from the cover, than the other ribs 207, 209 extending on a flat surface of the cover.

The ribs are mainly provided on the resilient parts since the non-resilient parts will not deform and be sucked against the device. It should also be noted that the ribs facilitate the insertion of the portable device in that the air that is compressed by the portable device passes between the cover and the portable device.

Figure 5:
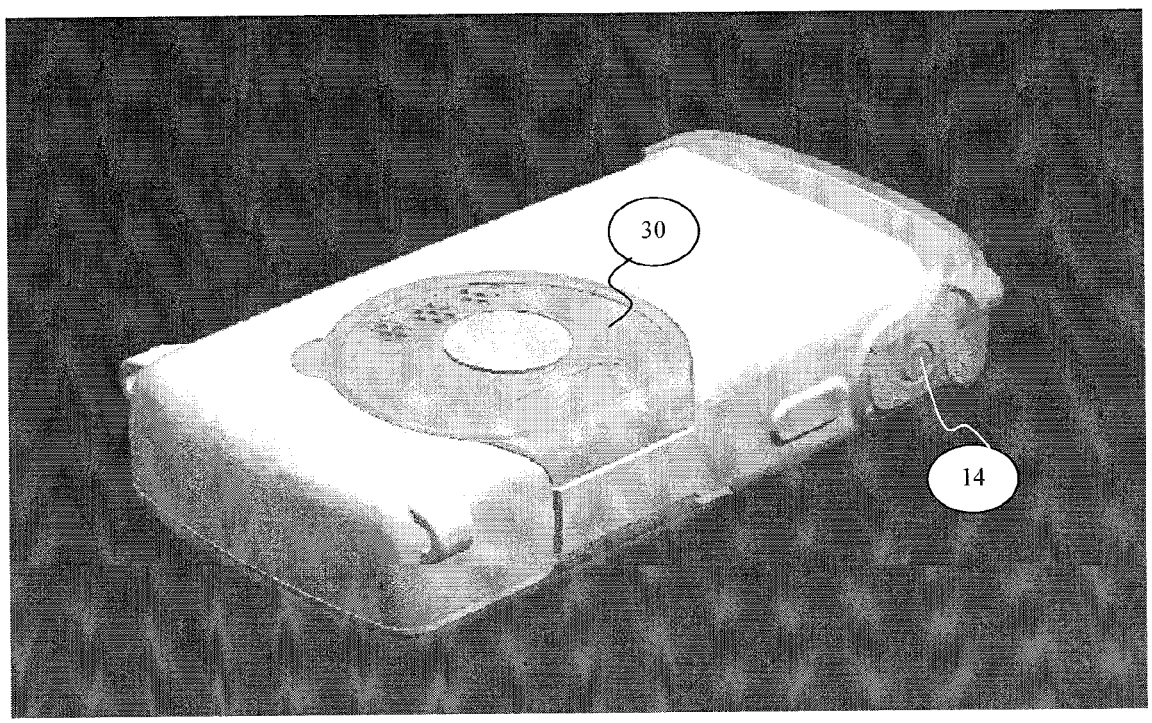
FIG. 5 is a perspective view of the rear of the cover.

Referring back to FIG. 2, in an embodiment of the invention a connection part 13 is arranged on the cover. The connection part 13 comprises a protruding section 14 arranged to receive a recess in the cap in order to connect the cap to the cover. The connection part may also comprise a recess 15 that corresponds to a protruding part arranged on the resilient part 8 in order to secure the connection part 13 to the cover 2. The connection part also provides an extra sealing edge surface between the cap and the cover 2. In FIG. 5 the cap 1 is shown in a mounted state on the cover, i.e. snapped on the protruding part 14 of the connection part 13.

Furthermore, in FIG. 5 a part 30 containing a sound membrane for letting out sound from the portable device is shown. The membrane is an air permeable membrane in order to seal off the portable device from the surrounding dust and the like, and at the same time letting out the sound.

For using the cover, the cap 1 is taken off and the portable device is slid into the cover through the opening 3. Thereafter, the cap 1 is pressed on the resilient part 8 of the cover providing an inner seal 7 as well as at least one outer seal due to the contact area of the bead.

Figure 10:
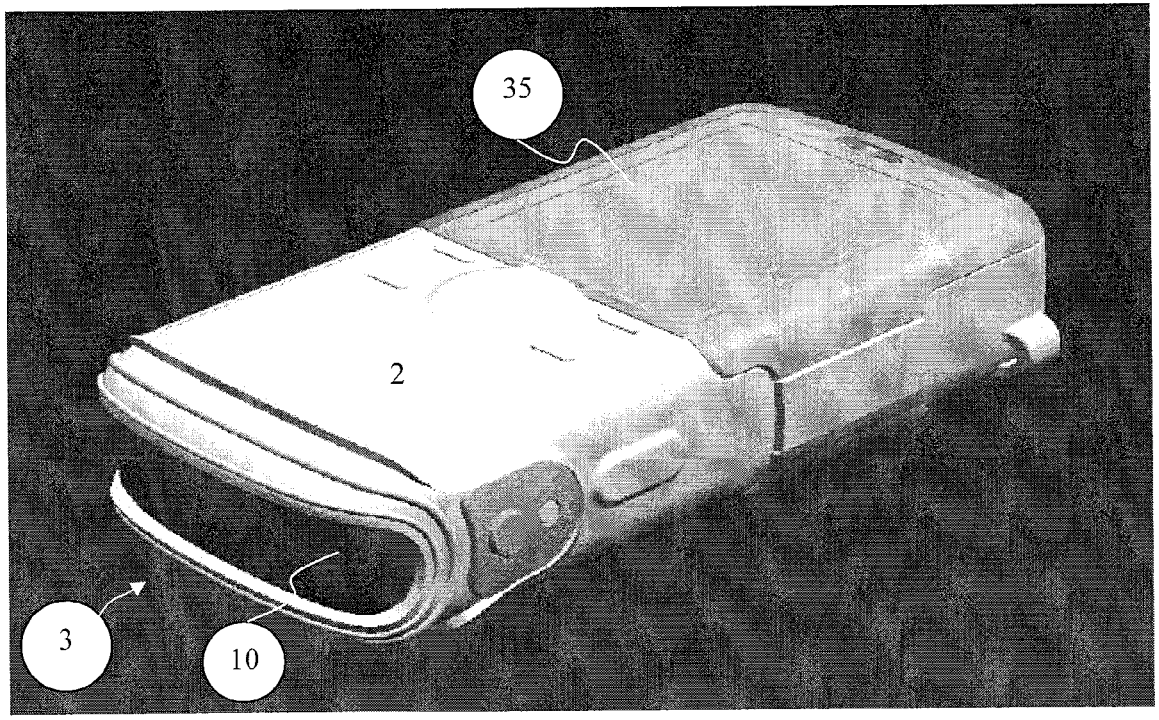
FIG. 10 is a perspective view of the cover with an inserted device.

In FIG. 10 a portable device 10 is indicated with an even darker shade as seen through the opening 3. The opening is supposed to be covered by a cap, as shown in FIG. 12.

Figure 11:
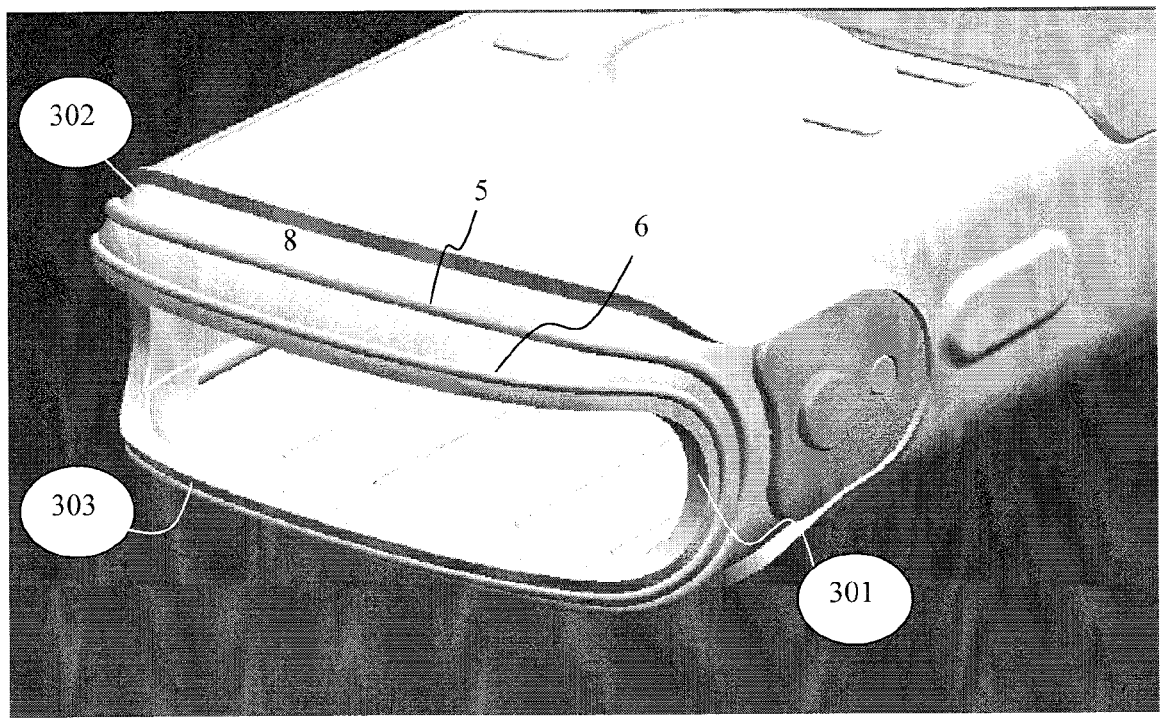
FIG. 11 is a perspective view of the cover without the device.
Figure 12:
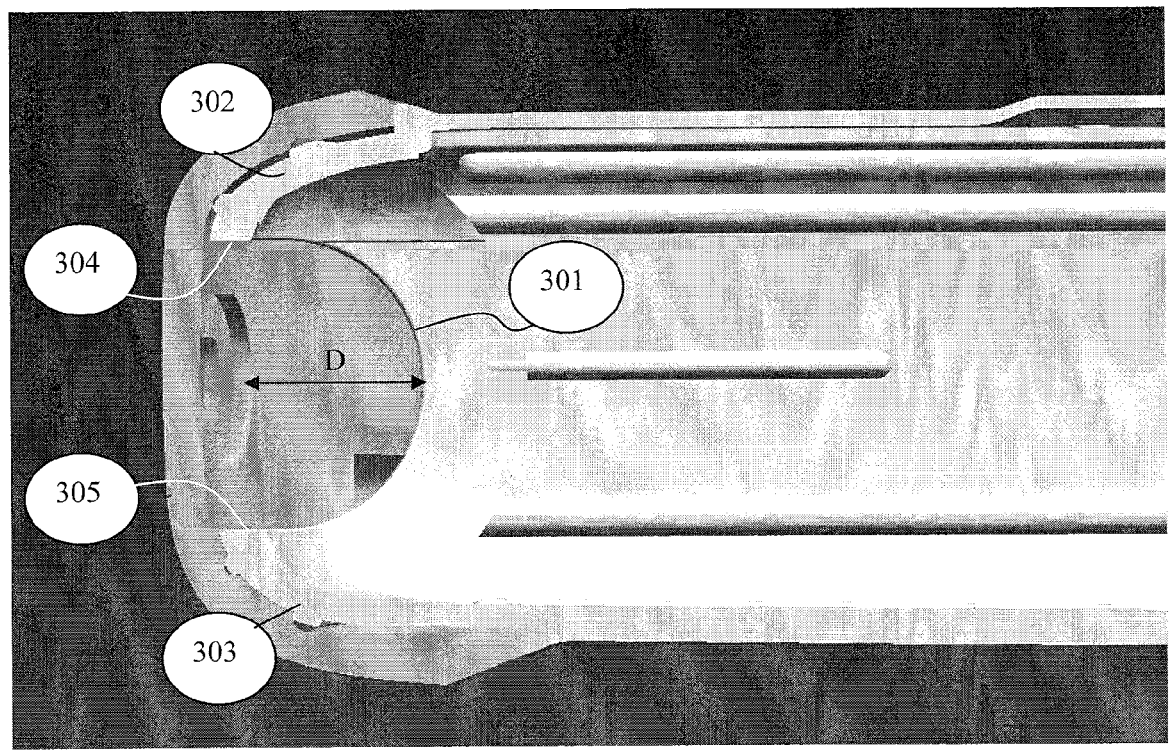
FIG. 12 is an enlarged cross sectional view of the opening of the cover with a cap arranged over the opening.

As may be seen from the FIG. 10-12, the opening 3 has a mouth-like shape with one upper lip 302 and one lower lip 303 extending over the whole width of the cover. At the corners, i.e. at the short sides of the cover, the opening is provided with a rounded shape 301 extending a distance, D, along the longitudinal direction of the cover. The corners are retracted this distance behind the upper and lower lips. It should here be noted that in the illustrated example the corner is formed as a half circle, but the corner may vary from a small curved shape, i.e. D is relatively short, to a long U-shape, i.e. D is relatively long, just as long as the opening has rounded corners seen from the side of the cover. Another aspect of the distance D is that when the cover is decored from the mould during moulding the permanent deformation of the cover will be as small as possible.

The shape of the opening results in that the lips 302,303 may be parted to widen the opening without overstraining the material, even at the corners. This means that there is less deformation during decoring of the cover from the mould, resulting in very little permanent deformation, even if the cover is not completely cured during the decoring. Also, it is easy for a user to remove the portable device by parting the lips, or just gripping the phone with a thumb and a finger by the rounded shape 301 of the corners and pulling it outwards, thus slightly parting the upper and lower lips.

The small stress and deformation of the material increases the durability of the cover as well.

In the illustrated example as shown in FIG. 12, the interior of the upper 302 and lower lip 303 has a curved shape. However, in an embodiment of the invention the interior as well as the exterior of the lips have a substantially planar shape.

Referring back to FIG. 10, a substantially non-resilient protective part 35 is disclosed covering the display area of the mobile device in order to stabilize and protect the display of the mobile device.

When manufactured, first, plastic, such as thermoplastic, silicone or the like is pressed or sprayed into the cast forming the cover, i.e. inserted in a heated state in to the mould cast. When the plastic has cooled down, the part of the cast forming the exterior of the cover is removed revealing the exterior of the cover and the core of the cast, forming the interior of the cover, is removed as well. Due to the shape of the opening 3 the lips are just slightly parted with a minor stress on the rounded corners, resulting in a reduced permanent deformation comparing to a cover without an opening according to the invention.

The foregoing has described the principles, preferred embodiments and modes of operation of the present invention. However, the description should be regarded as illustrative rather than restrictive, and the invention should not be regarded as limited to the particular embodiments discussed above. It should therefore be appreciated that variations may be made in those embodiments by those skilled in the art without departing from the scope of the present invention as defined by the following claims.

The invention claimed is:

1. A cover for protecting a portable device comprising:
a main body with resilient parts, an opening provided in a resilient part for insertion and removal of the portable device in an insertion/removal direction; and
a cap configured to be closed over the opening, wherein:
the main body is provided with a number of elements projecting on the inside, performing a venting function permitting air flow between the cover and the portable device during insertion and removal of the portable device; and
the elements are ribs extending in a direction of the cover at an angle to the insertion direction of the mobile device, the angle ranging from 0 degrees to approximately 60 degrees.

2. The cover according to claim 1, wherein the elements are provided on resilient parts.

3. The cover according to claim 1, wherein the elements are arranged to avoid contact with a keypad of the portable device.

4. The cover according to claim 1, wherein the ribs extend substantially along the whole length of the cover.

5. The cover according to claim 1, wherein the elements are ribs extending substantially in parallel with the insertion/removal direction.

6. The cover according to claim 1, comprising, at each side, at least two ribs provided at the top inner corner, one rib provided at the lower corner, and a number of ribs provided at the lower flat side.

* * * * *